UNITED STATES PATENT OFFICE.

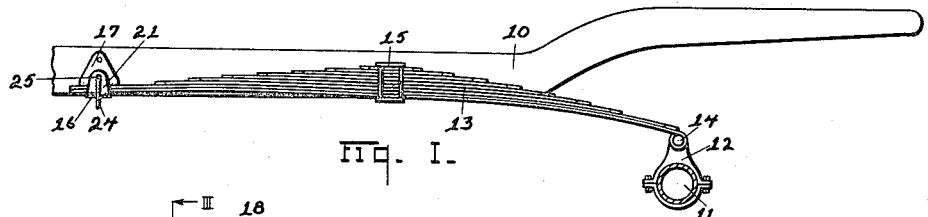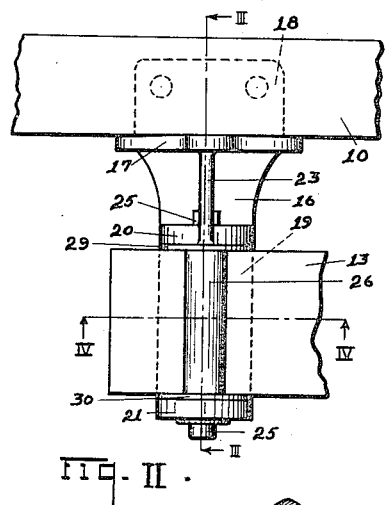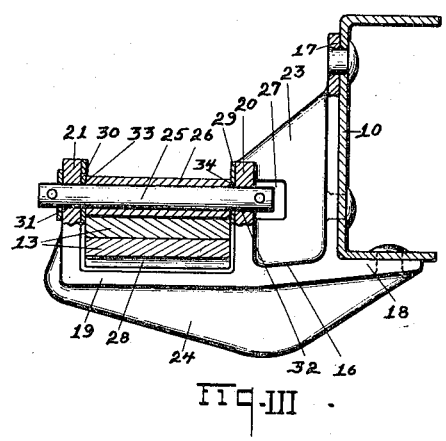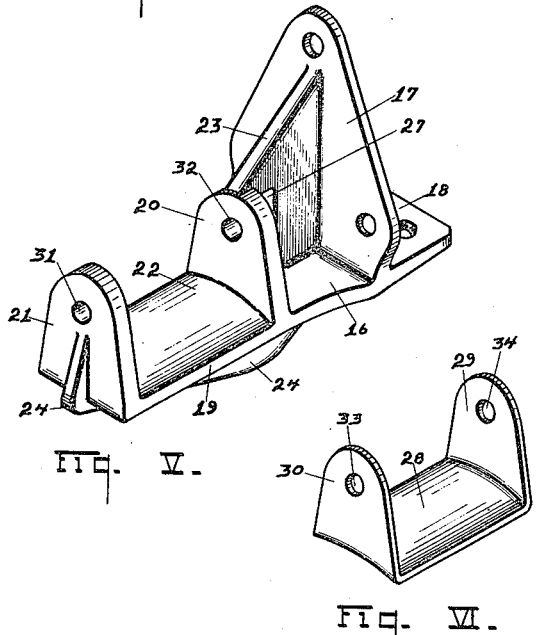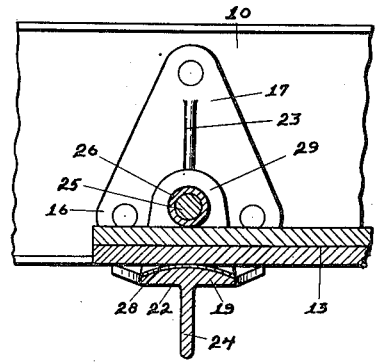

CHARLES W. McKINLEY, OF TOLEDO, OHIO, ASSIGNOR TO THE WILLYS-OVERLAND CO., OF TOLEDO, OHIO, A CORPORATION OF OHIO.

SPRING SUSPENSION FOR VEHICLES.

1,390,365.  Specification of Letters Patent.  Patented Sept. 13, 1921.

Application filed October 29, 1917. Serial No. 199,093.

*To all whom it may concern:*

Be it known that I, CHARLES W. MCKINLEY, a citizen of the United States, residing at Toledo, in the county of Lucas and State of Ohio, have invented certain new and useful Improvements in Spring Suspensions for Vehicles, of which I declare the following to be a full, clear, and exact description.

This invention relates to improvements in spring suspension for vehicles.

The principal object of this invention is to provide an improved connection between the forward end of a cantaliver spring and the frame, which will permit of a slight sliding movement of the spring, longitudinally thereof, relative to its point of connection with the frame.

Further objects, and objects relating to economies in manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawing, forming a part of this specification, in which—

Figure I is a view in side elevation of a part of a motor vehicle frame and spring suspension embodying my invention.

Fig. II is a fragmentary top plan view of the connections between the forward end of the spring and the frame.

Fig. III is a detail view, partly in side elevation and partly in section on the line III—III of Fig. II, showing the hanger connecting the front end of the spring with the frame.

Fig. IV is a detail, sectional view, taken substantially on the line IV—IV of Fig. II.

Fig. V is a detail perspective view of the hanger, and

Fig. VI is a perspective view of the saddle member carried by the hanger.

In the drawings, similar reference numerals refer to similar parts throughout the several views and the sectional views are taken looking in the direction of the little arrows at the ends of the section lines.

Considering the numbered parts of the drawings, I have shown a vehicle frame 10, a rear axle 11, and a cantaliver spring 13, which is connected at its mid point to the frame 10 by the shackle 15, the rear end of the spring being connected to the spring clip 12, which is fastened to the rear axle 11, by means of the pin 14.

My invention has to do with the manner of connecting the forward end of the spring to the frame. A hanger 16 is provided with a vertically extending flange 17, which is secured to the vertical side of the frame member 10, and a horizontally extending flange 18, which is connected to the horizontal lower surface of the frame member 10. The hanger 16 is provided with a lateral horizontally extending base portion 19, from which the posts or standards 20 and 21 extend upwardly. Said standards 20 and 21 are parallel to each other, and separated from each other substantially the width of the spring 13. The base portion 19 of the hanger, between the standards 20 and 21, is convexly curved, as illustrated in Figs. IV and V of the drawing. A saddle member is disposed between the standards 20 and 21, and comprises the convexly curved base 28, which fits over the convexly curved portion 22 of the hanger base 19, and the standards 29 and 30, which correspond to the standards 20 and 21 of the bracket. The hanger standards 20 and 21 are provided with the openings 31 and 32, and the saddle standards 30 and 29 are provided with the openings 33 and 34, which aline with the openings 31 and 32 respectively. A pin 25 extends through the openings 31, 32, 33 and 34, and a sleeve 26 is mounted rotatably on the pin 25. The standard 20 is braced from the vertically extending flange 17 by means of the rib 23, in which is provided an opening 27 to accommodate the end of the pin 25. The lower portion of the bracket is also braced by the rib 24. The forward end of the spring 13 is disposed between the standards 29 and 30, and between the sleeve 26 on the pin 25 and the convexly curved base 28 of the saddle member which fits on the base 22 of the hanger.

From the description of the parts given above, the operation of this device should be very readily understood. The forward end of the spring 13 is connected to the frame through the hanger bracket 16. The posts 20 and 21 prevent lateral movement or shifting of the spring, and, since the end of the spring is confined between the sleeve 26 carried on the pin 25 and the convexly curved base 22, lateral shifting in the vertical direction is also prevented. The convexly curved base 22 permits a slight rocking action of the spring end, relative to the hanger, and this is also facilitated by the rotatable sleeve 26, which engages the upper surface of the end of the spring. As a result, a slight longitudinal shifting of the spring and a slight rocking of the spring relative to the hanger is permitted, due to the flexing of the spring under use. The use of a hanger of this form does away with the necessity of providing a shackle or link connecting the forward end of the spring with the frame and makes a very simple and convenient means for connecting said forward end of the spring to the frame. This hanger bracket may be very cheaply and economically produced and gives exceptionally satisfactory results. The saddle member, comprising the base 28 and the posts 29 and 30, is the part which actually takes the wear occasioned by the movement of the spring relative to the hanger, and this saddle member can be very easily and quickly replaced if it becomes necessary on account of the wear of the parts.

I am aware that the particular embodiment of my invention, which I have here shown and described, is susceptible of considerable variation without departing from the spirit of my invention, and, therefore, I desire to claim my invention broadly, as well as specifically, as indicated by the appended claims.

Having thus described my invention, what I claim as new and desire to secure by Letters Patent, is:

1. In a vehicle, the combination of a frame; an axle; a cantaliver spring connected at its mid point to said frame and at one end to said axle; a hanger bracket secured to said frame to which the other end of said spring is connected, said bracket being provided with a pair of posts and a convexly curved base between said posts; a saddle member provided with a pair of upstanding posts and a convexly curved base, fitted on the base of said bracket and between said posts; a pin journaled in said posts; and a sleeve mounted on said pin, the end of said spring being confined between said sleeve and the convexly curved base of said saddle member.

2. In a spring support, a leaf spring, a bracket for slidably sustaining one end of the spring and provided with a pair of spaced posts and a convexly curved seat between the posts, a saddle member provided with a pair of upstanding posts and a curved face adapted to fit over the curved seat and between the posts of the bracket, and a pin journaled in said posts whereby the end of the spring is confined between the pin and the convexly curved face of the saddle member.

3. In a support for a leaf spring, a bracket for slidably sustaining one end of the spring, provided with a pair of spaced posts and an intermediate connecting base member, a saddle member provided with a pair of posts and a base member adapted to fit over the first mentioned base member and between the posts of the bracket, and a pin journaled in said posts, whereby the end of the spring is adapted to be confined between the pin and the base of the saddle member.

4. A support for a leaf spring, comprising a bracket for slidably sustaining one end of the spring, provided with a pair of spaced posts and an intermediate connecting base member, a saddle member provided with a pair of posts and a base member adapted to fit over the first named base member and between the posts of the bracket, a pin journaled in said posts, and a sleeve rotatably mounted upon said pin between the posts, whereby the end of the spring is adapted to be confined between the sleeve and the base of the saddle member.

In testimony whereof I affix my signature.

CHARLES W. McKINLEY.